April 11, 1967

P. A. SAY 3,313,669

METHOD OF FORMING A FLEXIBLE SEAL BETWEEN
TELESCOPICALLY ENGAGEABLE PIPE SECTIONS

Filed March 4, 1964

April 11, 1967  P. A. SAY  3,313,669
METHOD OF FORMING A FLEXIBLE SEAL BETWEEN
TELESCOPICALLY ENGAGEABLE PIPE SECTIONS
Filed March 4, 1964

United States Patent Office 3,313,669
Patented Apr. 11, 1967

3,313,669
METHOD OF FORMING A FLEXIBLE SEAL BETWEEN TELESCOPICALLY ENGAGEABLE PIPE SECTIONS
Peter Alan Say, Sydney, New South Wales, Australia, assignor to W. R. Grace & Co., Cambridge, Mass., a corporation of Connecticut
Filed Mar. 4, 1964, Ser. No. 349,376
Claims priority, application Australia, Mar. 19, 1963, 28,490/63
6 Claims. (Cl. 156—294)

This invention is concerned with improvements in methods of producing bell and spigot type pipe joints.

Forming joints between the bells and spigots of sanitary sewer and storm sewer pipe sections is not an easy procedure. Work space is severely cramped and it is extremely difficult to reach the inside area of the pipe joint, the pipe sections are exceedingly heavy and cannot be moved or manipulated into convenient positions, and often water or mud interferes with the joint filling operation. These difficulties increase almost in direct proportion to the size of the pipe concerned.

The present invention permits a flexible joint to be made simply and expeditiously. The apparatus may be employed either in the trench or in the casting yard, and tight, substantially root-proof but yielding joints may be readily made.

According to the present invention there is provided a method of forming a flexible seal between a pair of telescopically engageable pipe sections which have their respective mating end portions formed with a bell and spigot, said bell having an inner wall bounded at its inner end by an abutment wall and said spigot having an outer wall bounded by an abutment shoulder remote from the free end of the spigot, said method including the steps of adhering a resilient outer sealing member of sleeve-like formation to the inner wall of said bell in engagement with said abutment wall, adhering a resilient inner sealing member of sleeve-like formation to the outer wall of the spigot in engagement with said abutment shoulder, the dimensions of said sealing members, said bell and said spigot being predetermined so that the outside diameter of said inner sealing member when adhered to said spigot is greater than the inside diameter of the outer sealing member when adhered to said bell, and finally forcing the spigot with its inner sealing member into the outer sealing member located within the bell to a seated position wherein the outer sealing member surrounds the inner sealing member in such a manner that both sealing members are held under compression between the inner and outer walls of the bell and spigot respectively so as to form an effective flexible seal between the pair of pipe sections.

According to a further preferred feature, apparatus is provided for installing the outer sealing member of the gasket into its operative position in the bell of a pipe section, said apparatus including a pilot section insertable within the bore of said pipe section, an expandable pressure ring adapted to carry said outer sealing member, pressure means for selectively expanding the pressure ring and yieldable means resisting the expansion of said pressure ring, the construction of said apparatus being such that in use said outer sealing member is mounted on said expandable ring and the pilot section inserted into the bore of said pipe section so as to locate said outer sealing member in said bell opposite its operative position after which the pressure means is actuated to press the outer sealing member against the inner wall of the bell so that it may be adhered in its operative position after which the pressure means is deactuated so as to release the expandable ring from engagement with the outer sealing member with the aid of said yieldable means, thus enabling the apparatus to be withdrawn from the pipe section for a subsequent installation operation.

Reference is now made to the drawings in which.

Figure 1:
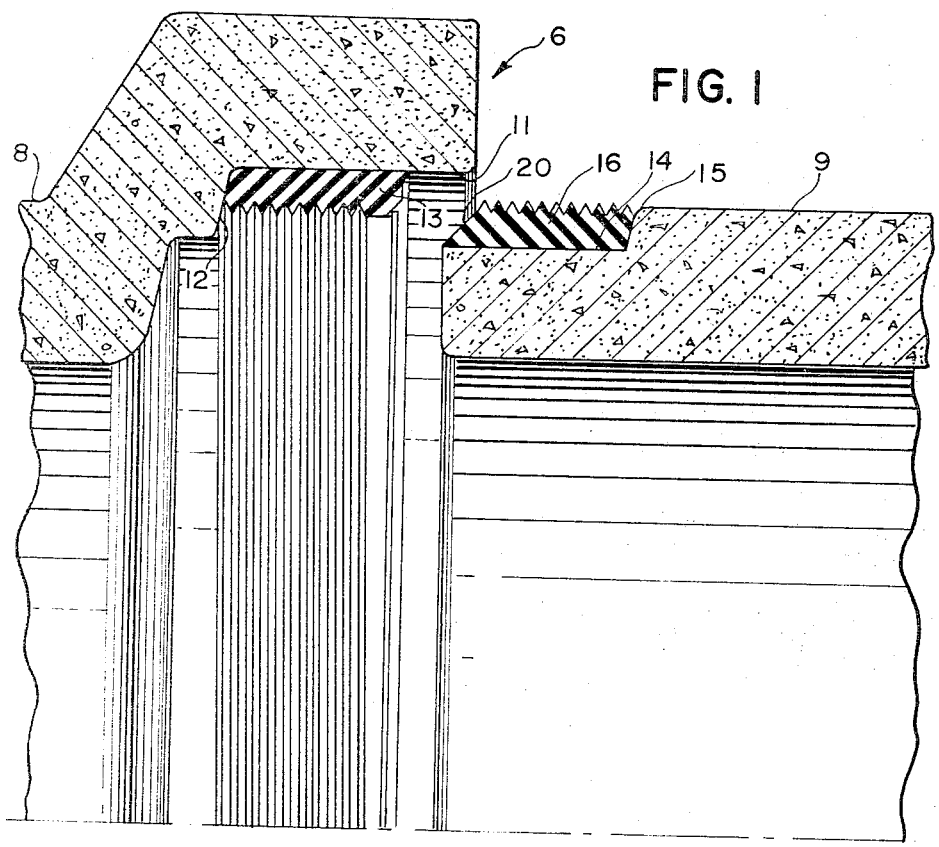
FIG. 1 is an exploded part-sectional view of an improved pipe joint according to the invention.

The invention requires modification of both the bell 6 and the spigot 7 of bell-and-spigot pipe sections 8, 9 to the form shown in FIG. 1. The entrance to the bell 6 is preferably made with a cylindrical inner wall 11 which terminates at the abutment wall 12 which forms an abutment preventing further displacement of the outer sealing member 13 when the spigot of the pipe section is forced into the bell.

The spigot 7 of the pipe section 9 is of reduced thickness forming an outer wall 14 and terminates at an abutment shoulder 15 which forms an abutment preventing the rearward displacement of the inner sealing member 16. Sealing members 13 and 16 are preformed rings preferably, but not necessarily, having a plurality of circumferential projections separated by circumferential grooves on their mating surfaces as shown. Those surfaces which lie against the pipe sections preferably are smooth.

Sealing members 13 and 16 are secured to the bell and spigot respectively by cementing to the pipe. The inner sealing member 16 is manually placed on the outer wall 14. The outer sealing member 13 is preferably secured to the inner wall 11 of the bell by apparatus illustrated in FIGS. 2 to 5. Many effective cementing compositions are commercially available and may be spread both on the bell and spigot end on the pipe contacting surfaces of sealing members which comprise the gasket by brush or by spraying. Types of adhesive which possess a quick "grab" and commercially known as "contact" types are particularly desirable. After the sealing members have been applied, an operation which can take place either in the pipe manufactory or in the trench, a substantially root-proof joint which possesses sufficient flexibility to permit the pipe to respond to slight earth movements without disturbing the seal is formed merely by forcing or jacking the spigot with its inner sealing member into the bell end of the adjacent pipe section.

The compositions which are useful to form the gasket may be one of numerous resilient elastomeric substances, i.e. vulcanized rubber, vulcanized chlorobutadiene, or a plasticized composition, typically plasticized polyvinylchloride. Other compositions, e.g. vulcanized butadienestyrene rubbers are also effective. Due to its inertness in the presence of fluids usually found in drainage lines, polyvinyl chloride is preferred. The combined thickness of the sealing members forming the gasket is slightly greater than the difference in diameter between the spigot and the internal diameter of the bell so that the gasket may be compressed as the tapered leading face 20 of the sealing member 16 is driven to its final seating position. The displaced material then bulges outwardly into the bell mouth. The inward and outward radial thrust exerted by the compressed gasket and directed against the bell and spigot walls maintains a tight seal.

Figure 5:
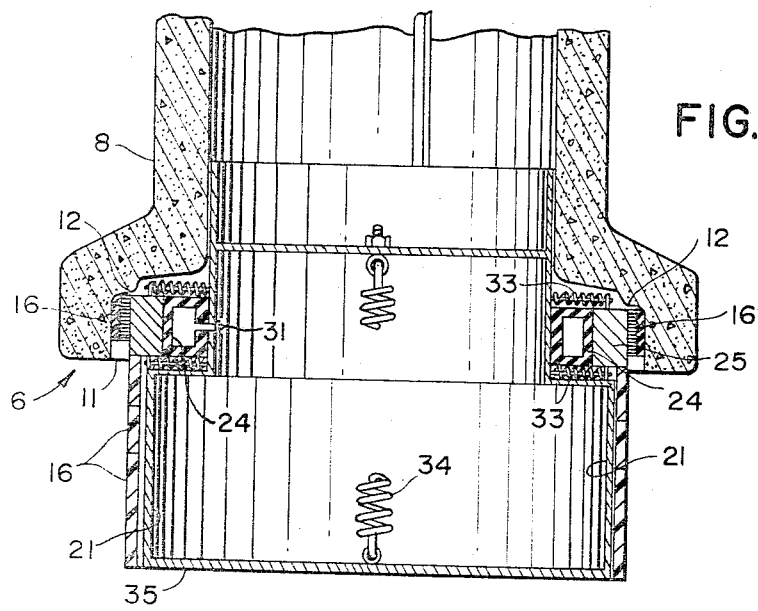
FIG. 5 is a sectional view of portion of a pipe section with the apparatus located in the bell end thereof in its operative position.
Figure 2:
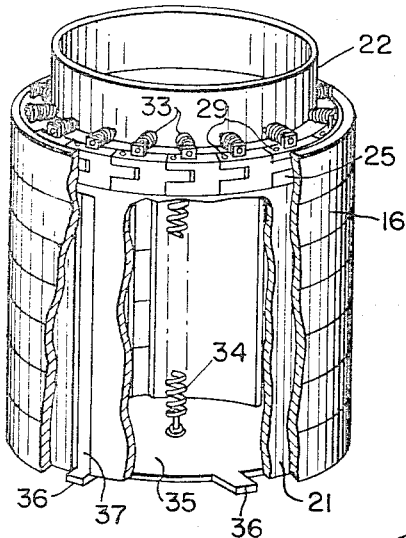
FIG. 2 is a perspective view, part cut-away, of apparatus in accordance with the invention.
Figure 4:
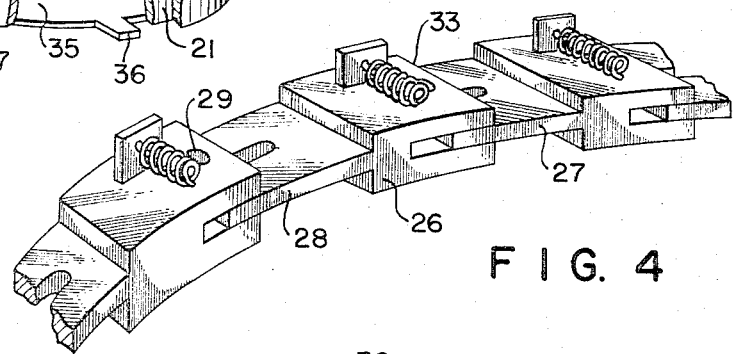
FIG. 4 is a perspective view of a portion of an expandable ring of the apparatus.

The apparatus which is used to secure outer sealing member 13 to the modified bell 6 of the pipe section 8 is built on a body section 21 from which projects cylindrical pilot section 22 and in use is placed in the bore of the pipe as shown in FIGURE 5. A circular tube 24 of elastic material such as rubber is fitted about the lower end of the pilot section 22, and surrounding this is an expandable metallic ring 25. This may be a circle of spring steel with overlapping ends, but particularly in the case of larger pipes, e.g. 36 and 42 inches in diameter, is preferably a ring of slotted links 26 each of which is provided with a tongue 27 having a slot 28 and which is secured to the adjacent link by the pin 29.

Tube 24 is provided with a nipple 31 which may be connected to a supply of compressed air or other fluid under pressure. When air is admitted into tube 24 it expands and increases the diameter of the ring of links 25. The body section 21 of the device is made of light sheet metal and may be handled manually in the trench or may be suspended from a crawler boom. If the device is used in the casting yard, it can be brought into position opposite the end-bells of the pipes in the same manner.

To use the device, a supply of pre-formed outer sealing members 13 is placed over body section 21. The uppermost sealing member is then coated on its exterior wall with quick grabbing cement. Pilot section 22 is inserted into the bore of the pipe after the inner wall 11 of the bell has been coated with a quick grabbing cement as has been described. Air is admitted through the nipple 31 to inflate the tube 24. As inflation occurs, the ring of links 25 expands, and forces the gasket firmly into contact with the inner wall of the bell. The pilot portion 22 insures that the gasket is accurately centered and since the air pressure forces all links radially outward the circumferential pressure on the gasket is uniform.

Figure 3:
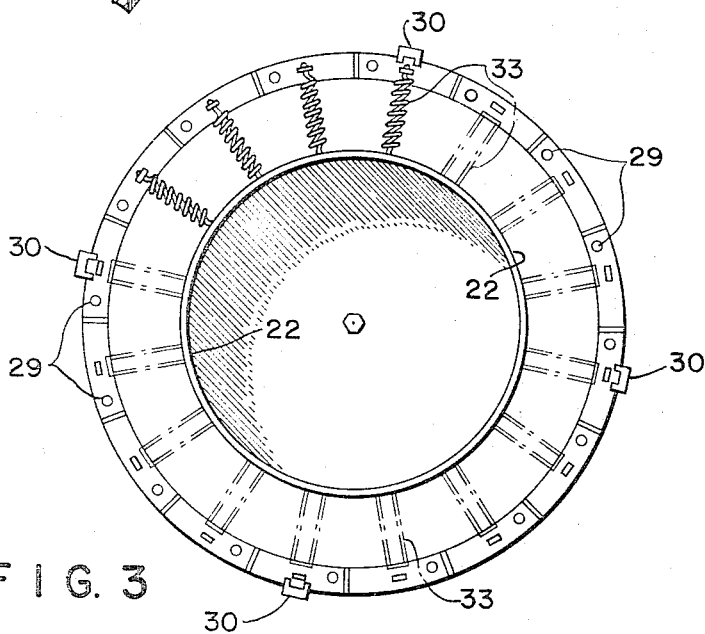
FIG. 3 is a plan view of the apparatus as shown in FIGURE 2.

After the inner sealing member has been stuck to the bell, air is released from the tube 24 and the ring of links 25 is pulled back to a smaller diameter by the pull springs 33—33, two of which are connected to each link as is shown in FIG. 3. As the apparatus is withdrawn from the tube, pull spring 34 lifts plate 35. Plate 35 is provided with a number of fingers 36 which ride in the slots 37 cut in the body section 21. As a result, the succeeding gasket moves upwardly to occupy the position previously occupied by the uppermost sealing member and the apparatus is ready to insert the next sealing member. Its forward motion is arrested by the stop fingers 30, which are attached to four or more links, depending on the pipe diameter, and project beyond the periphery of the links only sufficiently to check the forward motion of the sealing member.

In this manner outer sealing members may be rapidly applied to pipe sections lying in the trench. All reaching around, or using crooked tools to see that the gasket is securely seated in the pipe inverse is avoided.

Various alterations, modifications and/or additions may be incorporated in the foregoing without departing from the ambit of the invention as defined by the appended claims.

I claim:
1. A method of forming a flexible seal between a pair of telescopically engageable pipe sections which have their respective mating end portions formed with a bell and spigot, said bell having an inner wall bounded at its inner end by an abutment wall and said spigot having an outer wall bounded by an abutment shoulder remote from the free end of the spigot, said method including the steps of adhering a resilient outer sealing member of sleeve-like formation to the inner wall of said bell in engagement with said abutment wall, adhering a resilient inner sealing member of sleeve-like formation to the outer wall of the spigot in engagement with said abutment shoulder, the dimensions of said sealing members, said bell and said spigot being predetermined so that the outside diameter of said inner sealing member when adhered to said spigot is greater than the inside diameter of the outer sealing member when adhered to said bell, and finally forcing the spigot with its inner sealing member into the outer sealing member located within the bell to a seated position wherein the outer sealing member surrounds the inner sealing member in such a manner that both sealing members are held under compression between the inner and outer walls of the bell and spigot respectively so as to form an effective flexible seal between the pair of pipe sections.

2. A method as claimed in claim 1 wherein the inner and outer walls of the bell and spigot respectively are of substantially cylindrical formation, said spigot being formed by a reduced diameter portion on the end of its associated pipe section, the outside diameter of said inner sealing member being greater than the normal outside diameter of the pipe sections and the inside diameter of said outer sealing member being less than the normal outside diameter of said pipe sections.

3. A method as claimed in claim 1, wherein the bore surface of the outer sealing member and the outer surface of the inner sealing member are both provided with a plurality of circumferential projections separated by circumferential grooves.

4. A method of forming a pipe line incorporating a plurality of telescopically engageable pipe sections which includes the steps of forming the respective mating end portions of each adjacent pair of pipe sections with a bell and spigot, said bell being formed with an inner wall bounded at its inner end by an abutment wall, said spigot being formed with an outer wall bounded by an abutment shoulder remote from the free end of the spigot, adhering a resilient outer sealing member or sleeve-like formation to the inner wall of said bell in engagement with said abutment wall, adhering a resilient inner sealing member of sleeve-like formation to the outer wall of the spigot in engagement with said abutment shoulder, the dimensions of said sealing members, said bell and said spigot being predetermined so that the outside diameter of said inner sealing member when adhered to said spigot is greater than the inside diameter of the outer sealing member when adhered to said bell, and finally forcing the spigot with its inner sealing member into the outer sealing member located within the bell to a seated position wherein the outer sealing member surrounds the inner sealing member in such a manner that both sealing members are held under compression between the inner and outer walls of the bell and spigot respectively so as to form an effective flexible seal between the pair of pipe sections.

5. A method as claimed in claim 1 wherein the inner and outer walls of the bell and spigot respectively are of substantially cylindrical formation, said spigot being formed by a reduced diameter portion on the end of its associated pipe section, the outside diameter of said inner sealing member being greater than the normal outside diameter of the pipe sections and the inside diameter of said outer sealing member being less than the normal outside diameter of said pipe sections.

6. A method as claimed in claim 4 wherein the bore surface of the outer sealing member and the outer surface of the inner sealing member are both provided with a plurality of circumferential projections separated by circumferential grooves.

References Cited by the Examiner
UNITED STATES PATENTS

| | | | |
|---|---|---|---|
| 1,742,625 | 1/1930 | Weckerle | 156—293 |
| 1,949,470 | 11/1934 | Johnston | 156—294 X |

EARL M. BERGERT, *Primary Examiner.*

HAROLD ANSHER, *Examiner.*